Figure 1:
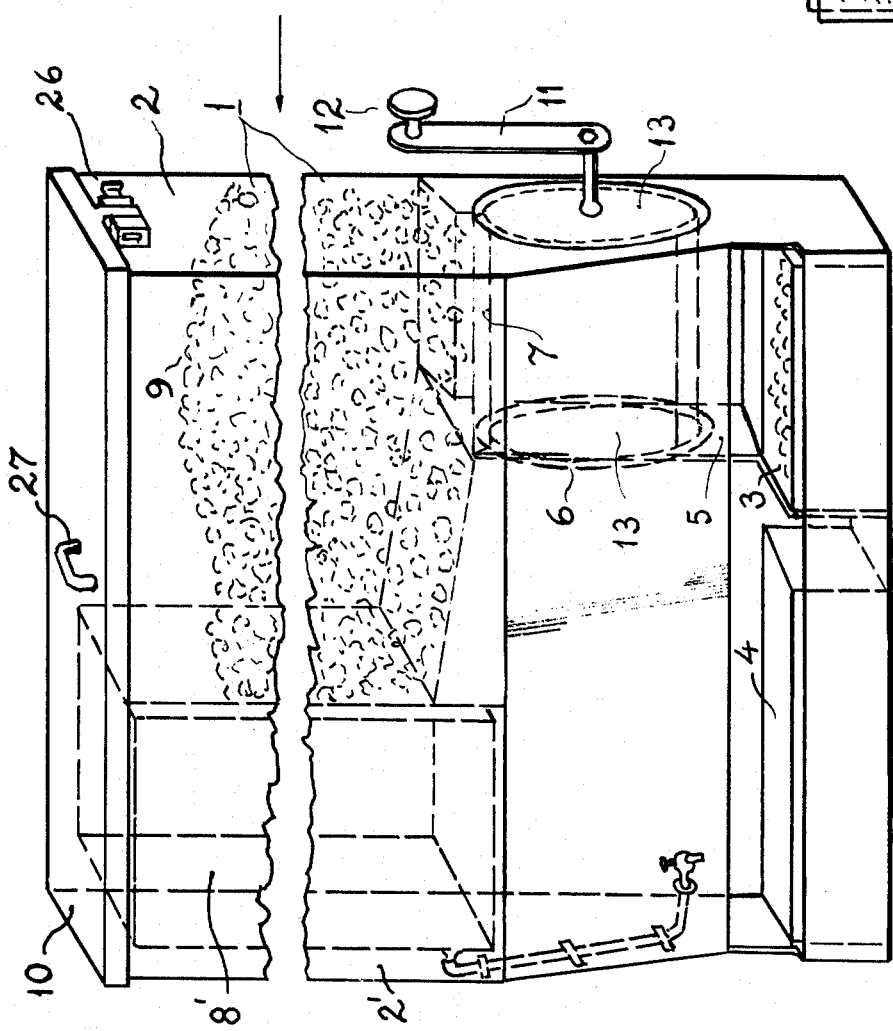

United States Patent [19]

Conger

[11] 4,050,415

[45] Sept. 27, 1977

[54] SELF-CLEANING ANIMAL FEEDER

[76] Inventor: Robert Arthur Conger, 51 Upper Welden, St. Albans, Vt. 05478

[21] Appl. No.: 693,715

[22] Filed: June 7, 1976

[51] Int. Cl.$^2$ ............................................. A01K 5/00
[52] U.S. Cl. .................................... 119/51.5; 119/56 R
[58] Field of Search ..................... 119/56 R, 51.5; 222/217, 222

[56] References Cited

U.S. PATENT DOCUMENTS

| | | | |
|---|---|---|---|
| 46,493 | 2/1865 | Peirce | 119/56 R |
| 3,034,688 | 5/1962 | Rudd | 119/56 R X |

Primary Examiner—Hugh R. Chamblee

[57] ABSTRACT

The compact new animal feeder deals out rations of loose dry or wet food by the turn of a handle. Turning backward the handle shuts off the supply. This assures measured rations every time. As the feeder has a measuring trough with a round inner surface, tumbling of dry food cleans the inside of the trough. By a resilient gate, crushing of hard food is avoided, and so is fine offal, which might jam the feeder.

1 Claim, 3 Drawing Figures

SELF-CLEANING ANIMAL FEEDER

Known animal feeders have been built with dispenser valves that include nooks, running into a sharp angle. In these nooks chunks of food become stuck. After some time they rot and turn the feeder messy and smelly. Also the rations are dealt out smaller. Other feeders lack cleanliness as they crush hard food; their mechanism becomes deformed and lets in roaches as well as other vermin.

To improve the design, the new animal feeder has a measuring trough in the shape of a hollow cylinder, cut open by a lengthwise slot, yet being closed by disks on the sides. Before feeding an animal, the slot is open to an outlet of a supply bin above, and thus is filled by gravity with grain or other food. A crank handle is attached to one of the disks, possibly by a shaft that can be stuck through a kennel- or zoo fence. An operator spins the measuring trough around its lengthwise axis until the slot faces toward a food tray and spills food into it.

The invention is illustrated in the drawing by an example.

Figure 2:
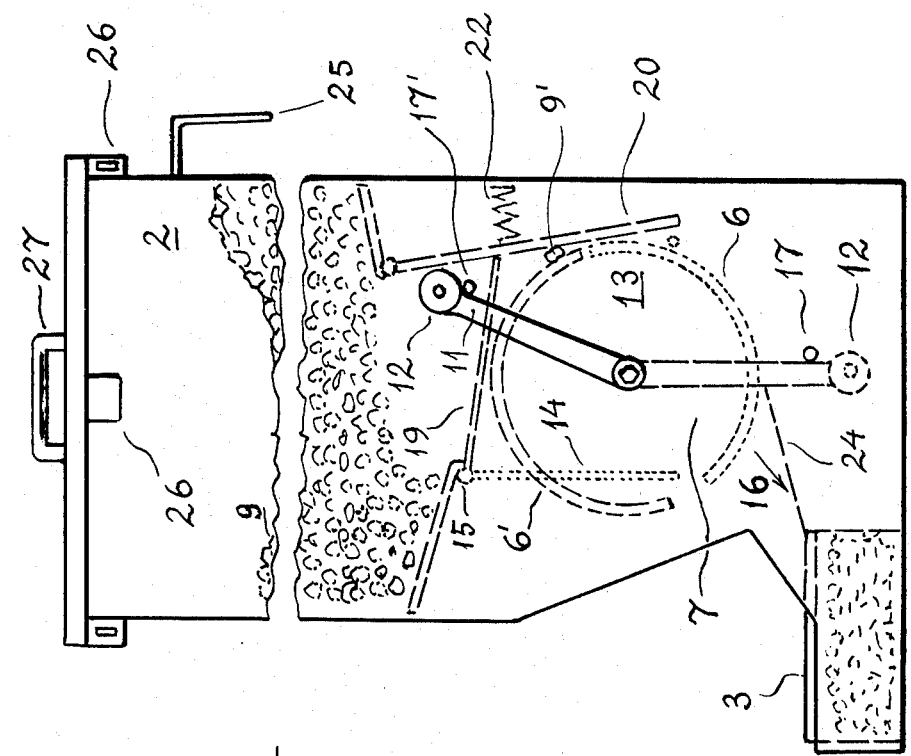
Figure 3:
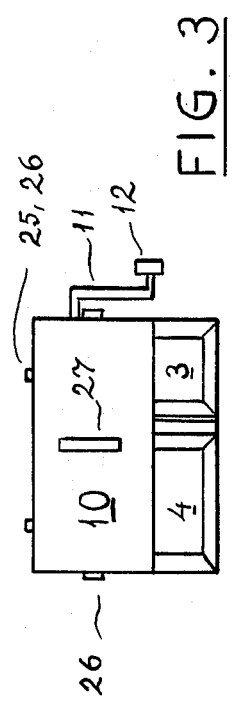

FIG. 1 is a perspective frontview,
FIG. 2 is a side view, and
FIG. 3 is a top view of the animal feeder according to the invention.

In FIG. 1 the housing 1 with side walls 2, 2' contains a removable food tray 3 and a water tray 4, separated by a middle wall 5. Above either tray there is room for an animal's head. A measuring trough 6, seated in openings of the walls 2 and 5, has a gate slot 7, taking in food chunks 9 from a food bin 8, and a cover 10. If a chunck is caught between a hinged, springloaded flap 20 and the trough (FIG. 2) in closing positon 6', the pressure pushes the flap against is spring 22. The flap holds back the chunk till the slot takes it in. A crank handle 11, having a handling knob 12, is fastened to the side disk 13 of the measuring trough 6. This crank handle, when turned, gives a double action: As shown in side view, FIG. 2, in its tray filling position the measuring trough 6 (dotted lines) allows a flap 14, which is hinged at 15, to fall down. The food flows by the flap 14 along arrow 16 only, when the crank lever 11 is being turned clockwise away from a stop 17 into position 6' (dashed lines). This makes the slot of trough 6' face down. The trough lip 18 lifts the hinged flap 14 into its position 19 (dashed line).

There the flap 14 meets the flap 20, which is hinged at 21, and springloaded by a pressure spring 22, that is resting against the back wall 23 of the housing. Together both flaps 19 and 20 shut off any supply from the supply bin 8 above, while a measure food ration tumbles out of the trough, stopped in position 6' by the fixed stop 17' that holds up the lever 11. The food ration slides down a sloping plane 24 and falls into the tray 3.

On its way down from the bin to the tray no chunk of food can withstand the sweeping force of the food flow, as there are no nooks, where it can hide or be wedged in. Therefore it will not rot and raise bad smells in an apartment, where the animal feeder is installed. Hooks 25 may help to fasten the feeder to a wall or furniture. As the feeder is made of molded plastic or of rustproof metal, it can be easily cleaned. However, dust or roaches will not get into the food bin or into the food on its way down to the food tray; In position 6 the outside surface of the trough closes the food exit, marked by the arrow 16.

FIG. 3 shows a top view of the animal feeder. The cover 10 has latches 26, so that the whole feeder can be carried by the cover handle 27 when the latches tie cover and housing together. After lifting the cover 10, a waterhouse may be used to fill the water tank 8' inside from the water main. The food bin is then also open for refilling with food chunks.

What I claim is:

1. A self-cleaning animal feeder, comprising:
   a cylindrical measuring trough for food, having a lengthwise slot as a food gate, and being mounted to be turned about a horizontal axis, so that the slot can be turned upward or downward;
   a housing whose walls form a bin for food chunks in an upper story, provide seats for the rotatable trough in an intermediate part of the housing, and give room lower than the measuring trough to a food tray for an animal;
   a first hinged flap, braced by a pressure spring against the inner housing, to slide along the outer surface of the spinning trough, but holding back any food chunk, caught between said surface and the flap, until the slot comes up, setting the food chunk free;
   a second hinged flap, being lifted by the slot edge after the food exit to where this flap butts with the first hinged flap, thus shutting off the food stream (FIG. 2);
   a downward opening in the food bin, aligned with the slot of the measuring trough in its upturned position, while the round trough wall is keeping the outlet hole of the feeder shut;
   two disk-shaped side walls of the measuring trough, of which one is fastened to a crank handle, adapted to turn the trough between two stops, one stop defining the upturned slot position for filling of the trough, the other marking the downturned position of the trough for emptying it;
   and a cover over the animal feeder, which cover may be removed, to supply food and water, the cover having latches, to fasten it to the feeder, and a handle on top, to transport the animal feeder.

* * * * *